United States Patent [19]

Hamilton

[11] Patent Number: 5,506,885
[45] Date of Patent: Apr. 9, 1996

[54] METHOD OF ADAPTING PROCESSING PARAMETERS IN A CALL PROCESSING SYSTEM

[76] Inventor: Chris Hamilton, 41 Harrison Ave., Montclair, N.J. 07043

[21] Appl. No.: 289,315

[22] Filed: Aug. 11, 1994

[51] Int. Cl.[6] .............................. H04M 1/24; H04M 1/60
[52] U.S. Cl. .............................. 379/6; 379/257; 379/283; 379/347; 379/390
[58] Field of Search ....................... 379/283, 351, 379/257, 102, 75, 406, 282, 6, 29, 27, 31, 347, 390

[56] References Cited

U.S. PATENT DOCUMENTS

| | | | |
|---|---|---|---|
| 4,028,493 | 6/1977 | Brennemann et al. | 379/257 |
| 4,399,535 | 8/1983 | Southard | 379/257 |
| 4,488,274 | 12/1984 | Plunkett, Jr. | 379/75 |
| 4,627,098 | 12/1986 | Dolikian et al. | 379/102 |
| 4,654,881 | 3/1987 | Dolikian et al. | 379/102 |
| 4,694,482 | 9/1987 | Reesor et al. | 379/27 |
| 4,696,031 | 9/1987 | Freudberg et al. | 379/257 |
| 4,807,274 | 2/1989 | Kousa | 379/6 |
| 4,887,288 | 12/1989 | Erving | 379/6 |
| 5,073,919 | 12/1991 | Hagensick | 379/29 |
| 5,257,309 | 10/1993 | Brandman et al. | 379/283 |
| 5,353,342 | 10/1994 | Pietrowicz | 379/257 |
| 5,353,345 | 10/1994 | Galand | 379/283 |
| 5,392,348 | 2/1995 | Park et al. | 379/283 |
| 5,406,621 | 4/1995 | Binal | 379/351 |

*Primary Examiner*—Jeffery Hofsass
*Assistant Examiner*—Scott Wolinsky
*Attorney, Agent, or Firm*—Jeffrey I. Kaplan

[57] ABSTRACT

A method and apparatus for utilizing DTMF tones and supervisory tones in a call processing system to adjust parameters for future tones and/or speech. The tones initially received are analyzed to determine characteristics such as signal-to-noise ratio, twist, signal level, etc. Processing parameters for future tones and speech are adjusted based upon the characteristics of a first tone.

18 Claims, 3 Drawing Sheets

METHOD OF ADAPTING PROCESSING PARAMETERS IN A CALL PROCESSING SYSTEM

TECHNICAL FIELD

This invention relates to telephony, and more specifically, to an improved technique of detecting and processing both control tones as well as other audio signals (e.g.; speech) in a call processing system.

BACKGROUND OF THE INVENTION

Automated Voice Processing Systems (VPS) have become prevalent over the past several years. Such systems typically include means for automatically answering a telephone and presenting the caller with a plurality of menu choices, any one or more of which may be selected by entering dual tone multi-frequency (DTMF) digits. The digits are detected and processed by one or more software applications. The different menu choices allow the user to achieve functions such as retrieving information, transferring bank balances, recording voice messages to be transmitted to others, and numerous other such applications.

Typically, a user is presented with a plurality of choices in the form of an audible menu. The user selects a desired choice by pushing predetermined DTMF tones.

It can be appreciated that the accurate detection of DTMF tones is critical to providing a reliable voice processing system. For example, if the DTMF detector incorrectly decodes a DTMF tone which has been entered, then the system may enter some undesirable mode or may even hang up on the caller. Additionally, during any time that the remote caller is speaking to the VPS, the caller's voice may simulate a DTMF tone, thereby causing the VPS to take the action associated with such DTMF tone being simulated. This phenomenon is termed talk off.

Finally, when the VPS is playing a message back to the caller, such message may be echoed back and interpreted by the DTMF detector as a valid DTMF tone. This is termed play off in the industry. Both talk off and play off may cause the system to enter some undesirable mode.

Numerous signal processing algorithms are presently commercially available for detecting DTMF tones. Most if not all of the algorithms take into account certain characteristics of the DTMF tones in order to determine and decode these tones. Such characteristics include, for example, average tone energy, signal-to-noise (SNR) ratio, twist, and one or more other parameters.

Twist is a parameter utilized by telephone engineers to define the difference in amplitude levels between the two frequencies that are contained within the DTMF tone. In the United States, the two frequencies are generated at equal levels, but the frequency response of the telephone network often causes one of the frequencies to be attenuated more than the other. Thus, if this difference in attenuation were 1 db, the DTMF signal that arrives at the receiver is said to have a twist of 1 db. In certain foreign countries, the DTMF signal is initially generated with a predetermined twist (e.g.; 2 db), and may arrive at the receiver with a different amount of twist.

A problem with analyzing these characteristics and therefore with detection of the DTMF digits, is that they often vary greatly from call to call. For example, average tone energy may vary by as much as 40 db from one call to the next. Thus, the portion of the DTMF detector which accounts for average tone energy must presume that if the tone energy is anywhere within a 40 db range, that a valid DTMF tone is present. This determination does not mean that a valid DTMF tone will be detected because other characteristics (e.g.; frequency, twist, etc.) must also meet the detection criteria before the system will conclude that a valid tone is present. These other characteristics of the tone, which include signal-to-noise ratio, twist, etc., may vary over large ranges from telephone call to telephone call.

The fact that these detection characteristics vary so greatly means that these systems are susceptible to phenomena such as talk off and play off. If the ranges within which some or all of these parameters are required to be for detection could be narrowed, then talk off and play off would occur less often.

Specifically, consider twist as a particular signal characteristic utilized in DTMF detection. The VPS is configured so that if the twist is within a predetermined range, then the DTMF detector presumes that a valid DTMF tone may have produced this twist. The larger the acceptable range, the more likely it is that voice will have characteristics which fall within that range, and that therefore, talk off will occur.

In view of this problem, it can be seen that there exists a need in the art to provide added protection against the phenomena of play off and talk off.

SUMMARY OF THE INVENTION

The above and other problems of the prior art are overcome in accordance with the present invention which relates to a system for improved tone detection. Specifically, in accordance with the present invention, a set of initial detection parameters is utilized to detect a first tone entered by a remote user. The detection characteristics of this tone are analyzed. Based upon the values of these detection characteristics (average tone energy, SNR, twist, etc.) present in the first received tone, detection parameters utilized to detect other tones and to process speech are adjusted.

For example, rather than the 40 db range of average energies which must be accepted by the initial DTMF detector, the DTMF detector could limit subsequent digits to have an average energy of no more than plus or minus 3 db from the average energy present in the first tone. Absent some unexpected and unlikely change in the transmission channel, the average energy in any two DTMF tones during a single telephone call will not vary by more than 3 db.

Concerning the twist parameter, initial ranges might be approximately ±10 db. However, once the initial tone is detected, the amount of twist is measured, and determined to be, for example +5 db. The DTMF detector can then presume that future tones will have a twist between +3.5 and +6.5 db. Thus, the acceptable twist has been narrowed from a 20 db range to a 3 db range, making it significantly less likely that twist exhibited by voice will fall within this range.

Concerning signal-to-noise ratio, this ratio is likely to vary by no more than 5 db during a particular telephone call. It is noted that the "range" of acceptable values is defined slightly differently than other parameters. Specifically, most of the other parameters are modified by measuring the value present in the initial tone and then setting a predetermined range around said value. For example, if the average signal energy is x, one might detect future DTMF tones by requiring that the average signal energy be x plus or minus 3 db.

Such a technique is not applicable to the signal-to-noise ratio characteristic because if a "dirty" signal is received initially, then certainly "cleaner" signals should be correctly detected in the future. This is true even if future signals are much cleaner, and therefore, have a much higher signal-to-noise ratio than the initial tone.

If the logarithmic signal-to-noise ratio detected in an initial DTMF tone is denoted "S", then future DTMF tones would be required to have a signal-to-noise ratio of greater than S minus v, where v is a predetermined value. For example, an acceptable technique might be to require all future tones to have a signal-to-noise ratio of better than 6 db below the signal-to-noise ratio present in the first tone. Intuitively, this can be viewed as requiring that if the first DTMF tone has a certain "cleanliness", then future tones will be required to be at least "almost" as clean.

Thus, after the initial tone is detected, subsequent tones are detected only if all detection characteristics meet predetermined secondary detection parameters, which secondary parameters are different from the initial detection parameters allowed for detection of the first tone.

Other embodiments include utilizing the invention to detect not only DTMF tones, but call progress tones, such as ring back, busy, etc.

In still further embodiments, the detection characteristics present in the initial tones are used to adjust speech processing parameters (e.g.; gain). In any of the embodiments, the important feature is that processing parameters (speech amplification, detection parameters, or otherwise) are adjusted based upon signal characteristics present in the first tone.

DETAILED DESCRIPTION OF THE PREFERRED EMBODIMENT

Figure 1:
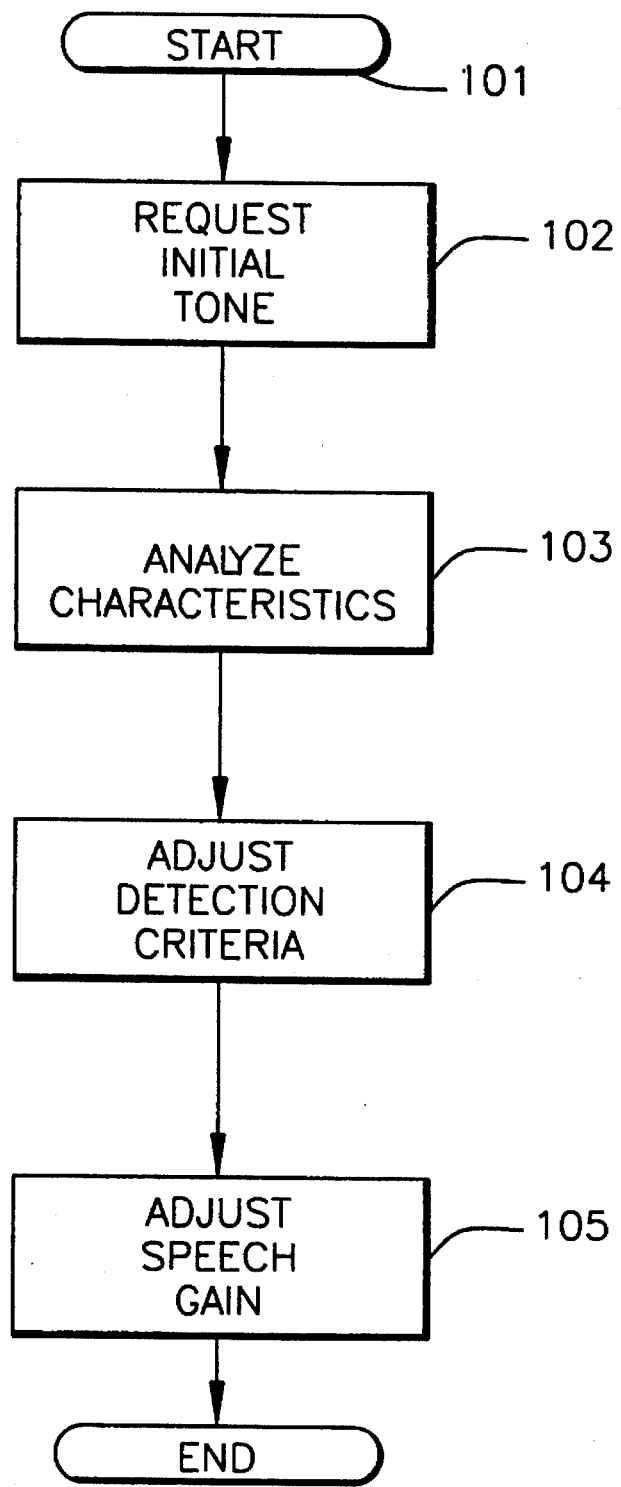
FIG. 1 shows a conceptual block diagram of a flow chart for implementation of the present invention.

FIG. 1 shows a flow chart of a sequence of steps to be executed by the tone detection algorithm in order to adapt detection parameters utilized during a particular telephone call; i.e., to alter the detection parameters based upon detection characteristics present in the first received tone as discussed above. The program is entered at block 101 and control is transferred to request initial tone block 102.

Block 102 generates an audible message which informs the user to enter a DTMF tone. Request initial tone block 102 may be part of the preexisting menu, or may be added to specifically accommodate the present invention. For example, many voice processing systems include an audible message such as "to leave a message, press 2". The subsequent depression of the digit 2 can be utilized as the initial tone.

Whether the initial tone is in response to an existing menu choice or whether it is in response to an audible message specifically incorporated for the present invention, the idea is that the initial tone is entered at a point in the call just after the VPS has requested entry of a tone. Utilizing such a method, the chance that the initial "tone" would actually be an error caused by talk off or play off is minimized. This technique is highly preferable because if the VPS mistakes speech for the first tone, then the detection parameters for all future tones could be incorrectly adjusted.

After the initial tone is received, operational block 103 analyzes the characteristics discussed above. The signal-to-noise ratio, twist, average signal energy, and one or more other characteristics are analyzed by the DTMF detector. The values of these characteristics are recorded for use in adjusting detection parameters (e.g.; the ranges discussed previously) used for future tones.

Concerning average signal energy, rather than a 40 db range, the detection criteria may be adjusted so that future DTMF tones must have a signal energy within 3 db of the signal energy detected in the initial DTMF tone. Concerning twist, typical initial values of maximum acceptable twist are ±10 db, however, operational block 104 adjusts this range so that the twist must be within ±1.5 db of the twist detected in the initial tone.

Concerning signal-to-noise ratio, the initial signal-to-noise ratio is utilized to set a floor below which the signal-to-noise ratio may not fall. Specifically, the signal-to-noise ratio of the initial tone, minus 3 db, is the lowest signal-to-noise ratio which will be determined to be a valid DTMF tone. Any future signal having a signal-to-noise ratio less than 3 db below the signal-to-noise ratio of the initial tone will be considered noise and/or speech.

Operational block 105 is directed to the speech processing portion of the VPS. Specifically, it has been found that tone level is typically no more than 10 db higher than maximum speech level. Thus, an indication of the tone level may be used to adjust the speech amplification so that clipping is avoided. This additional embodiment, described below in further detail, enhances the processing of speech by utilizing characteristics of the received tone to reduce or eliminate "clipping".

Figure 2:
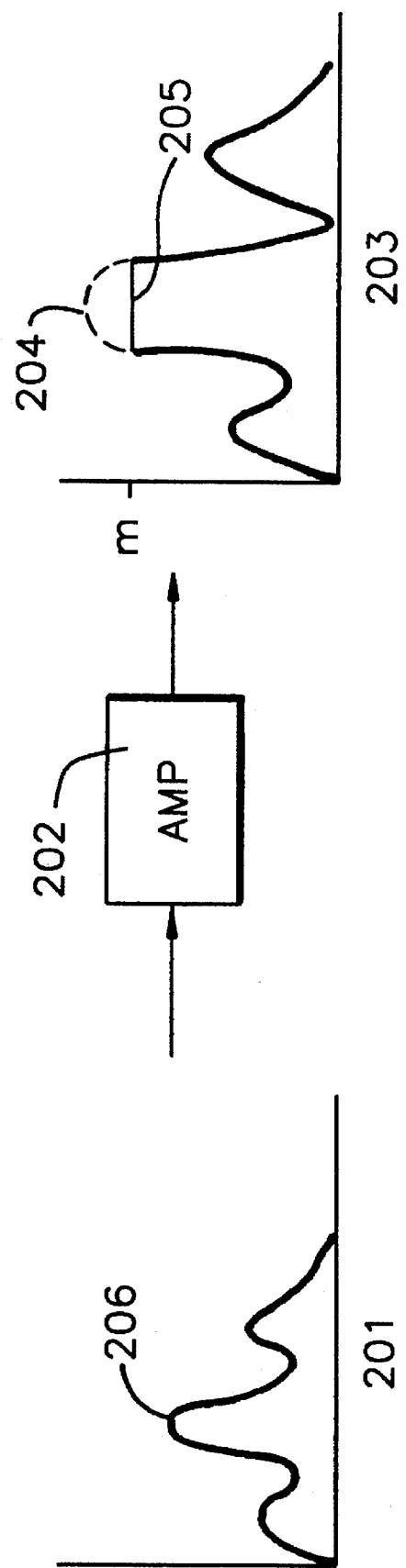
FIG. 2 depicts the problem of "clipping" in voice processing systems.

Clipping is a phenomenon which occurs when a signal is amplified beyond a maximum level permitted by the hardware and/or software in the system. FIG. 2 indicates an example of clipping.

Signal 201 is placed through amplifier 202 and amplified as indicated by signal 203. The maximum level m represents the highest permissible level of signal output. The value of m depends, for the most part, upon the hardware and software configuration present in the system. This value is easily determined by the system designer.

Dotted portion 204 shows how the signal should have been amplified were it not for clipping. However, in actuality, the amplified signal 203 includes a flat portion 205. It can be appreciated that this flat portion is distorted from what should be the case. It can be further seen by those of ordinary skill in this art that in order to provide maximum amplification while avoiding clipping, the highest point 206 of signal 201 should be amplified just enough to reach the maximum point m on signal 203.

Toward this goal, many voice processing systems include automatic gain control (AGC). AGC is a technique whereby the signal amplitude of incoming speech is periodically monitored and dynamically adjusted as the volume varies. The concept behind AGC is to constantly adjust the gain of the system so that the speech is at the maximum possible level, while still maintaining the dynamics of the speech itself (i.e.; avoiding clipping).

The problem facing such AGC systems is that the first few milliseconds of a person's speech are often significantly lower in amplitude than the actual speech level. Thus, when the AGC acts upon this initial portion of the speech, it sets the gain to a level much higher than desirable. Consequently, the first few syllables of the speech often incur severe clipping, which clipping diminishes once the AGC algorithm has analyzed a sufficient amount of speech at the normal speaking level.

The present invention avoids this problem by utilizing an initial tone level in order to set the initial gain of the speech amplifier. It has been found that the maximum speech level following a DTMF tone is typically somewhere between the tone level and 10 db below the tone level. The technique is described in general terms below, after which a specific implementation is discussed.

The initial gain of the speech amplifier is adjusted such that a signal arriving which is at the same level as the received tone energy will be amplified to the maximum permissible level. This amplification is utilized, for example, for the first one full second of speech rather than utilizing a gain dictated by the AGC. The technique avoids the problem of having the AGC algorithm adjust the gain based upon the first few milliseconds of speech, which portion of this speech is not truly indicative of the maximum speech level to follow.

Alternatively the system designer may decide that signals arriving which are at, for example, 2 db below the tone level will be amplified to the maximum permissible level. In that instance, signals which arrive with an initial amplitude greater than 2 db below the tone level will be clipped. The probability of such clipping occurring however, is extremely small and therefore may be acceptable.

During the exemplary one second time period that the gain of the amplifier is based upon the initial received tone level rather than the AGC algorithm, some slight cost is incurred. Specifically, considering the case where speech at the tone level is amplified to the maximum permissible value, if the maximum speech level is greater than the tone level, clipping will occur. Additionally, if the maximum speech level is less than the received tone level, then maximum amplification is not achieved, i.e.; the gain could have been set higher without any clipping occurring.

After the first few seconds of speech is amplified in accordance with the present invention, the AGC algorithm is used to adjust amplification levels for speech during the remainder of the telephone call. The particular details of the AGC algorithm will not be described herein because such algorithms are known in the art. The particular AGC algorithm used is not critical to the operation of the present invention.

By utilizing the tone level to adjust speech amplification and then later utilizing an AGC algorithm to adjust the amplifying gain, the AGC algorithm is only operating based upon true speech level and not the first few milliseconds thereof which are not indicative of the maximum speech level. Thus, the distortion typically present when speech begins is minimized.

Figure 3:
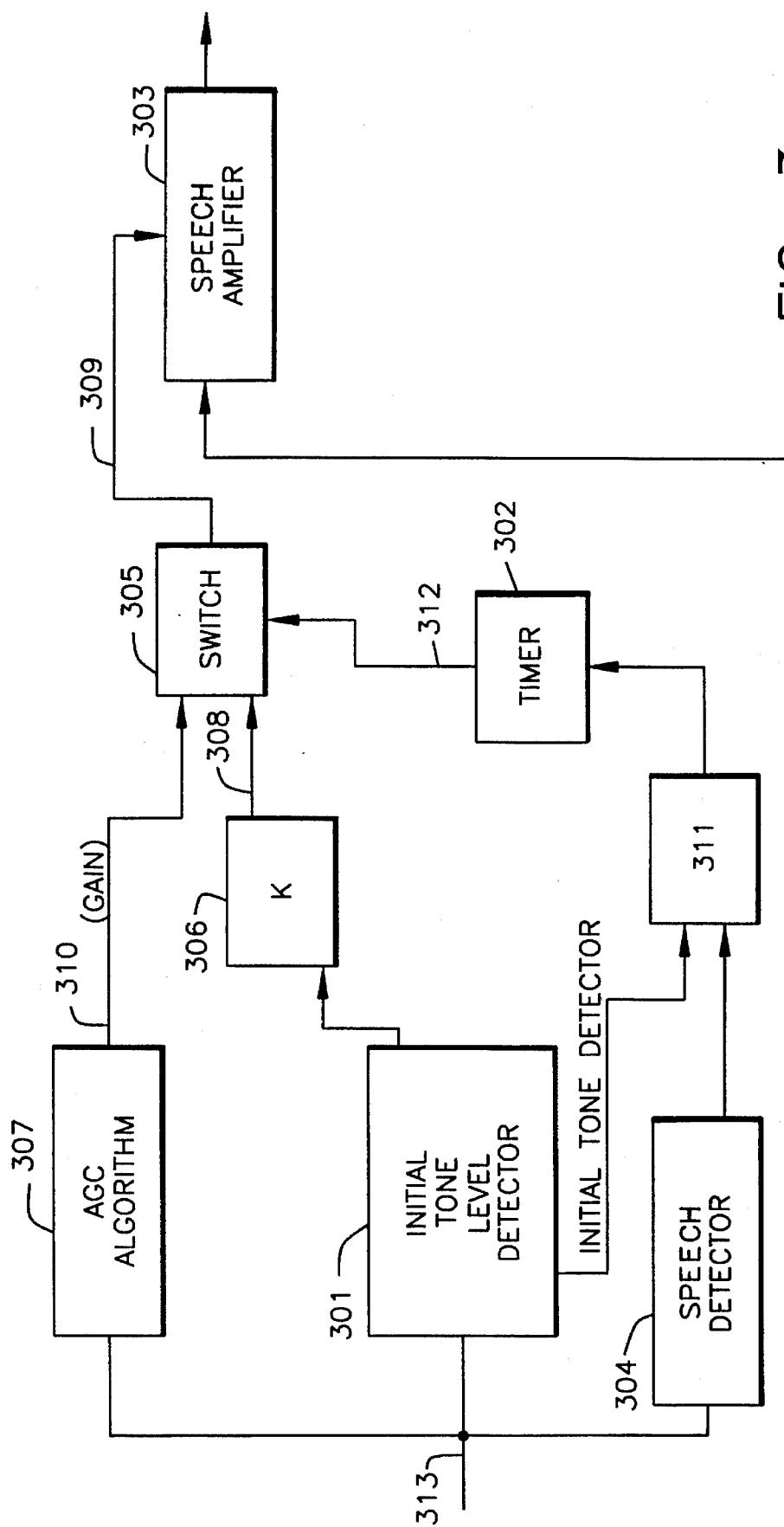
FIG. 3 shows a block diagram of an arrangement for implementing gain control of speech signals using the present invention.

FIG. 3 shows a block diagram of an exemplary arrangement which could be used to implement improved gain control of audio signals. The arrangement of FIG. 3 includes several blocks which may represent either software modules and/or hardware as the system designer may desire. The blocks shown are for purposes of demonstrating functions only and are not meant to indicate any specific circuit configuration or software implementation.

Switch 305 is a standard electronic data switch which alternates between two inputs, one of which comes from AGC algorithm 307, and the other of which comes from the output of multiplier 306. During the time that it is desirable to amplify speech based upon the initial tone level detected, switch 305 connects line 308 to 309. During the time that it is desirable to control the gain of speech amplifier 303 based upon the output of an automatic gain control algorithm, switch 305 connects line 310 to line 309. If switch 305 is implemented in software, it would be an "If . . . then" statement which simply chooses one of two possible values for the gain of speech amplifier 303.

In operation, initial tone level detector 301 determines the average energy level in the initial DTMF tone. This average energy level is used to adjust the multiplier 306 which provides an input 308 to switch 305. Once the initial tone is received, the proper level for initial amplification of the speech during the first second thereof is determined and represented by a digital number placed on line 308.

Thereafter, when the speech begins, speech detector 304 detects the presence of such speech. When the speech is first detected after the initial tone has been received, logic function 311, starts timer 302 to count off a predetermined amount of time. This time is determined by the designer and is intended to be that time frame during which it is desirable to adjust the speech amplifier gain based upon initial tone level rather than based upon the AGC algorithm. A typical value of this time is one second.

Concerning logic function 311, the requirements of this function are to (i) detect the initial tone; (ii) detect the first speech that occurs after the initial tone; and (iii) start the timer 302 at the appropriate time. There are numerous techniques to accomplish this with well known logic circuitry, and the details of the implementation are not critical to the present invention.

During the one second interval described above, timer 302 places a signal on line 312 which causes switch 305 to connect line 308 to line 309. Line 309 is then used by the speech amplifier to adjust its gain in accordance with well known principles. However, when the proper time (e.g.; one second) expires, the signal on line 312 reverses polarity and switch 305 then i) disconnects line 308 from line 309 and ii) connects 310 to line 309. Thus, at this point in time and thereafter, the gain of the speech amplifier is determined by the AGC algorithm 307. The AGC algorithm may be any of the variety of well known algorithms which have been in widespread use for many years.

It can be appreciated from FIG. 3 and the description thereof that the first few milliseconds of speech are not used to adjust the gain of the speech amplifier. Thus, the distortion caused by the fact that the first several milliseconds of the speech are far often below the maximum level is eliminated. After this initial time frame passes, and the speech is closer to an maximum value at which it will remain, the AGC algorithm can function more stably and is therefore utilized as usual.

While the above describes the preferred embodiment of the present invention, it will be apparent to those of ordinary skill in the art that other variations and additions can be constructed. For example, other processing parameters related to supervisory tones, speech, and/or DTMF detection may be adjusted and/or determined based upon an initial tone.

I claim:

1. A method of processing audio signals which contain speech and tones in a voice processing system (VPS), said method comprising the steps of:

detecting an initial tone entered by a user of said VPS;

analyzing detection characteristics associated with said initial tone;

determining expected detection characteristics of signals received subsequent to said step of analyzing based upon said detection characteristics present in said initial tone; and establishing processing parameters for subsequently received signals based upon said expected detection characteristics.

2. The method of claim 1 wherein said processing parameters include gain.

3. The method of claim 1 wherein said initial tone is a dual tone multi-frequency tone.

4. The method of claim 3 wherein said detection characteristics include one or more of the following:

signal to noise ratio, twist, and average signal energy.

5. The method of claim 3 wherein said subsequently received signals include dual tone multi-frequency tones.

6. The method of claim 5 wherein said processing parameters include gain.

7. Apparatus for processing audio signals in a voice processing system (VPS), said apparatus comprising:

means for detecting an initial tone entered by a user of said VPS;

means for analyzing detection characteristics associated with said tone;

means responsive to said analyzing means for determining expected detection characteristics of signal receive subsequent to said initial tone based upon detection characteristics present in said initial tone; and means for establishing processing parameters for subsequently received signals based upon said expected detection characteristics.

8. Apparatus of claim 7 wherein said means for establishing includes means for establishing processing parameters for use in detecting dual tone multi-frequency tones.

9. Apparatus of claim 7 wherein said means for detecting said tone includes means for detecting a dual tone multi-frequency tone.

10. Apparatus of claim 9 wherein said means for analyzing detection characteristics includes means for analyzing one or more of the following:

twist, signal to noise ratio and average signal energy.

11. Apparatus of claim 9 wherein said means for establishing includes means for establishing processing parameters for use in detecting dual tone multi-frequency tones.

12. Apparatus of claim 11 wherein said means for establishing includes means for establishing parameters associated with speech processing.

13. Apparatus for altering gain to be applied to an incoming audio signal in a voice processing system (VPS), said apparatus comprising:

means for determining energy level in an initial tone entered by a user of said VPS; and means for altering the gain to be applied to said audio signal based upon said energy level for a predetermined initial time period and for altering the gain to be applied to said audio signal based upon a parameter other than said energy level subsequent to said time period.

14. Apparatus of claim 13 wherein said means for altering the gain to be applied to said audio signals after said initial time period expires includes an automatic gain control algorithm.

15. Apparatus of claim 14 wherein said initial time period is no more than one second.

16. A method of altering gain to be applied to an incoming audio signal in a voice processing system (VPS), said method comprising the steps of:

determining energy level in an initial tone entered by a user of said VPS; and altering the gain to be applied to an audio signal based upon said energy level only for a predetermined initial time period.

17. The method of claim 16 further comprising the step of altering the gain of said audio signal based upon an automatic gain control algorithm after said initial time period expires.

18. The method of claim 17 wherein said time period is no more than one second.

* * * * *